US008560949B2

(12) United States Patent
Rissanen

(10) Patent No.: US 8,560,949 B2
(45) Date of Patent: Oct. 15, 2013

(54) POWER GRID VISUALIZATION

(75) Inventor: Mikko Rissanen, Kungsängen (SE)

(73) Assignee: ABB Research Ltd., Zurich (CH)

( * ) Notice: Subject to any disclaimer, the term of this patent is extended or adjusted under 35 U.S.C. 154(b) by 18 days.

(21) Appl. No.: 13/264,643

(22) PCT Filed: Jun. 29, 2009

(86) PCT No.: PCT/EP2009/058123
§ 371 (c)(1),
(2), (4) Date: Oct. 14, 2011

(87) PCT Pub. No.: WO2010/118784
PCT Pub. Date: Oct. 21, 2010

(65) Prior Publication Data
US 2012/0036464 A1    Feb. 9, 2012

Related U.S. Application Data

(60) Provisional application No. 61/202,889, filed on Apr. 17, 2009.

(51) Int. Cl.
G06F 3/048 (2013.01)
(52) U.S. Cl.
USPC .......................................... 715/711
(58) Field of Classification Search
USPC .......................................... 715/711
See application file for complete search history.

(56) References Cited

U.S. PATENT DOCUMENTS

| 2005/0041026 A1 | 2/2005 | Haynes |
| 2006/0238364 A1 | 10/2006 | Keefe et al. |
| 2009/0030556 A1 | 1/2009 | Castelli et al. |
| 2009/0055527 A1 | 2/2009 | Akiyama |

FOREIGN PATENT DOCUMENTS

| JP | 2000-50531 A | 2/2000 |
| JP | 2002-95187 A | 3/2002 |

Primary Examiner — Steven Sax
Assistant Examiner — David Choi
(74) Attorney, Agent, or Firm — Birch, Stewart, Kolasch & Birch, LLP

(57) ABSTRACT

A method in a power transmission or distribution system, an operator terminal in such a system as well as to a computer program product from such an operator terminal, wherein the operator terminal presents graphical objects representing electrical power transmission control stations together with graphical objects representing power lines on a display, and changes the degree of abstraction of the presentation based on an operator selection or an own selection. A change from a lower to a higher degree involves moving a group of graphical objects including control stations closer to a condensation center point on a power line that is common for this group, and a change from a higher to a lower condensation degree involves moving the group away from the condensation center point.

20 Claims, 5 Drawing Sheets

POWER GRID VISUALIZATION

CROSS REFERENCE TO RELATED APPLICATIONS

This application is the National Phase of PCT/EP2009/058123 filed on Jun. 29, 2009, which claims priority under 35 U.S.C. 119(e) to U.S. Provisional Application No. 61/202,889 filed on Apr. 17, 2009. The entire content of all of the above applications is hereby incorporated by reference.

FIELD OF THE INVENTION

The present invention generally relates to operator terminals in transmission or distribution systems. More particularly the present invention relates to a method of allowing an operator to get an improved overview of a presentation of electrical power transmission control stations and power lines, an operator terminal in a process control system as well as to a computer program product for such an operator terminal.

BACKGROUND

To visualize a power grid with several dozens or even hundreds of power lines and electrical power transmission control stations such as power converter stations and substations has been traditionally difficult from the human operator's point of view. So far only trivial visualization methods have been available. Such methods scale up poorly in visual terms and the operator gets lost in details when hundreds of individual stations and power lines are shown, which draw the operator's attention to each of them individually. Therefore, it is difficult to see the big picture as an overview of the power grid.

The fundamental challenge in visualization of power grids is to find a good balance between the amount and accuracy of information and its visual representation to an operator of an operator terminal, where the operator terminal is part of a supervisory control system to supervise, monitor and control the power grid. Such supervisory control system is also known under the term SCADA (Supervisory Control And Data Acquisition). As shown in FIG. 1, which shows an overview of a global power transmission system in the United States, display of individual power lines and stations of a power grid may result in too much information. Furthermore, if the transmission flow on the power lines is display using animated arrows, an overview would be obtained where there is much motion on the screen that draws the operator's eye equally to all power lines. This problem is usually avoided by adding layers that hide or show different types of power lines. Still, it is difficult to see the larger trends of e.g. transmission flow.

In power transmission or distribution systems, there may exist a large amount of system related data. Today it is hard for an operator to discern the data that is of relevance to him or her and then especially if the amount of power lines and stations are great.

Known visualizing systems are for instance described in US 2006/0238364, which discloses a visualization system for monitoring performance data of an electrical power distribution network. Indicia representing transformers are provided on a map and colour coded for conveying performance data.

JP 2000050531 describes presenting a power system in three dimensions. Here a node voltage is displayed using a column with a height representing the voltage. Reactive power is presented through a sphere.

JP2002095187 describes visualization of a power distribution system for display in a WWW browser.

US 2009/0055527 describes a system for specifying arbitrary nodes and identifying a section between them on a system diagram. Here a table has positional information of nodes and data regarding a span between them.

US 2005/0041026 describes providing a graphic display of an electrical distribution network. The network includes power stations and power lines. In the system network operation data in the form incidents occurring at locations within a network segment are presented.

However, none of these documents provide a satisfactory visualization technique, when there are a lot of power lines and control stations.

The present invention is directed towards improving on this situation.

SUMMARY OF THE INVENTION

The present invention is therefore directed towards improving the presentation of electrical power transmission control stations and power lines in an operator terminal of a supervisory control system for a power transmission or distribution system.

The problem is according to the invention solved through applying a clustering method that abstracts all the power grid's visible features to larger entities, which enables an operator to see hundreds of stations and power lines at once with good overview. The degree of abstraction is dynamic and may be user-controlled, which allows the operator to choose the proper degree of abstraction according to his or her work situation. It is also possible with various types of automatic abstraction. From the visualization point of view, there is no limit to scalability i.e. how much information can be seen at once as clustered entities.

This problem is also solved by a method of enabling an operator to obtain a better overview of a presentation of electrical power transmission control stations connected to power lines in a power transmission or distribution system, where the control stations and power lines are presented via graphical symbols on an operator terminal display, comprising the steps of:
  presenting graphical objects representing the electrical power transmission control stations together with graphical objects representing the power lines, and
  changing the degree of abstraction of the presentation based on an operator or operator terminal selection,
  wherein
  a change from a lower to a higher degree involves moving a group of graphical objects including graphical objects representing control stations closer to a condensation centre point provided on a graphical object representing a power line that is common for this group, and
  a change from a higher to a lower degree involves moving the group away from the condensation centre point provided on the graphical representation of said common power line.

This problem is also solved by an operator terminal in a power transmission or distribution system including a display, a user input unit and a control unit configured to present graphical objects representing electrical power transmission control stations together with graphical objects representing power lines on the display, and change the degree of abstraction of the presentation based on an operator selection or an own selection, wherein the control unit when changing from a lower to a higher degree is configured to move a group of graphical objects including graphical objects representing control stations closer to a condensation centre point provided on a graphical object representing a power line that is common for this group, and when changing from a higher to a lower degree is configured to move the group away from the condensation centre point provided on the graphical representation of said common power line.

This problem is furthermore solved by a computer program product on a data carrier comprising computer program code configured to cause an operator terminal provided in power transmission or distribution system to, when said program code is loaded into the operator terminal present graphical objects representing electrical power transmission control stations together with graphical objects representing power lines on a display of the operator terminal, and change the degree of abstraction of the presentation based on an operator or operator terminal selection, wherein a change from a lower to a higher degree involves moving a group of graphical objects including graphical objects representing control stations closer to a condensation centre point provided on a graphical object representing a power line that is common for this group, and a change from a higher to a lower degree involves moving the group away from the condensation centre point provided on the graphical representation of said common power line.

The term power transmission system is here to be understood as a power grid comprising power transmission and/or distribution lines and electrical power transmission control stations such as power converter stations and substations.

BRIEF DESCRIPTION OF THE DRAWINGS

The present invention will in the following be described with reference being made to the accompanying drawings, where FIG. 1 schematically shows an overview of a global power transmission system, FIG. 2 schematically shows a computerized process control system in the for of a power transmission system, FIG. 3 schematically shows an operator terminal of the present invention, FIG. 4 schematically shows an overview of a local power transmission system presented with one degree of abstraction on an operator terminal in the power transmission system of the present invention, FIG. 5 schematically shows an overview of the local power transmission system presented with another degree of abstraction on the operator terminal, FIG. 6 schematically shows a flow chart of a number of method steps being performed in a method according to a first variation the invention, FIG. 7A schematically shows an overview of a simplified power transmission system with power lines and substations presented at a minimum condensation degree, FIG. 7B schematically shows an overview of the simplified power transmission system with power lines and substations presented at a medium condensation degree, FIG. 7C schematically shows an overview of the simplified power transmission system with power lines and substations presented at a higher condensation degree, FIG. 8 schematically shows an overview of the power transmission system in FIGS. 4 and 5 with a medium abstraction degree.

DETAILED DESCRIPTION OF THE INVENTION

In the following, embodiments of the invention providing the above described functionality will be described.

Figure 2:
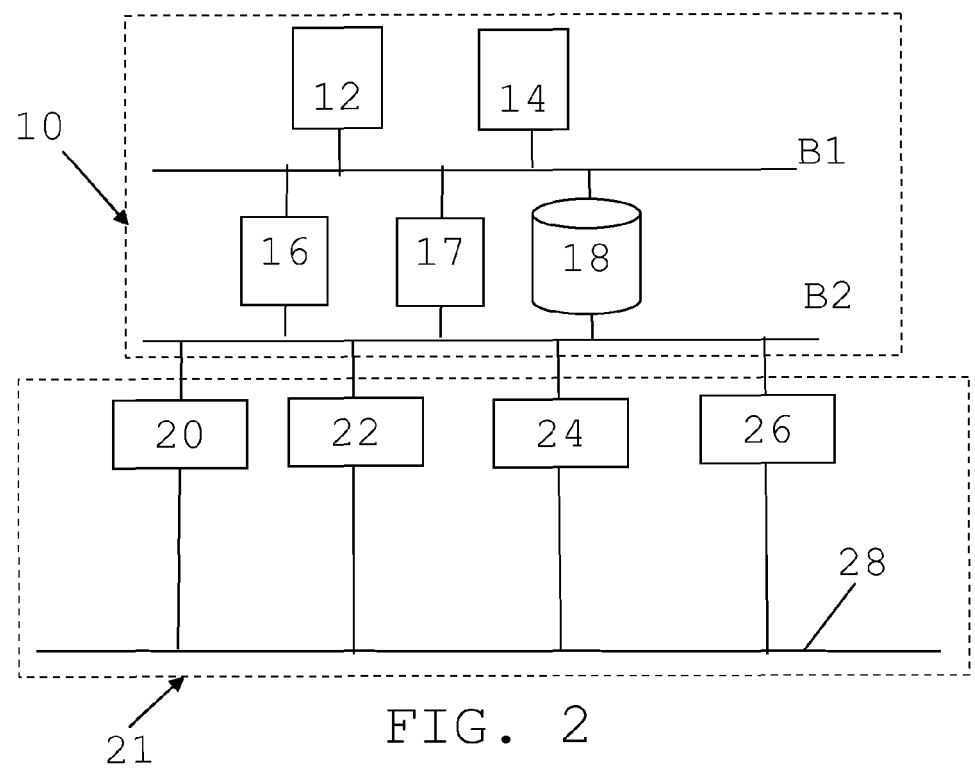

FIG. 2 schematically shows a supervisory control system 10 for a power transmission or distribution system 21. The supervisory control system 10 may typically be an object based computerised system for controlling the transmission of power through the system 21 comprising a power grid 28 with one or more power or distribution lines and electrical power transmission or distribution control stations as well as control and measurement units 20, 22, 24 and 26 further explained below. In FIG. 2, the power grid 28 is for simplicity only shown as one power line.

In FIG. 2 the supervisory control system 10 includes a number of operator and engineering terminals 12 and 14 connected to a first bus B1. There is furthermore a second bus B2 and between the first and second busses there are connected a first server 16 providing control and monitoring of a first part of the power transmission or distribution system 21, a second server 17 providing control and monitoring of a second part of the system 21 and a database 18 where data relating to control and monitoring of the power transmission or distribution system 21 is stored. To the second bus B2 there are furthermore connected control and measurement units for providing control signals from the supervisory control system 10 to the power grid 28 and measurement signals from the power grid 28 to the supervisory control system 10. In the figure there are provided four such control and measurement units 20, 22, 24 and 26 connected to the power grid 28. It should here be realized that some of these may only be provided for control, some only for measurements and some for both control and measurements. Such units are thus all involved in controlling the transmission or distribution of power in the power transmission or distribution system or measuring physical properties of the power transmission or distribution system, here in particular of the power line 28. The control and measurement units do also provide information on their on properties or status. The measurement units can include current, voltage and power measurement units such as current transformers or voltage transformers, while control units can include circuit breakers, relays, power semiconductor switches and tap changers.

Figure 3:
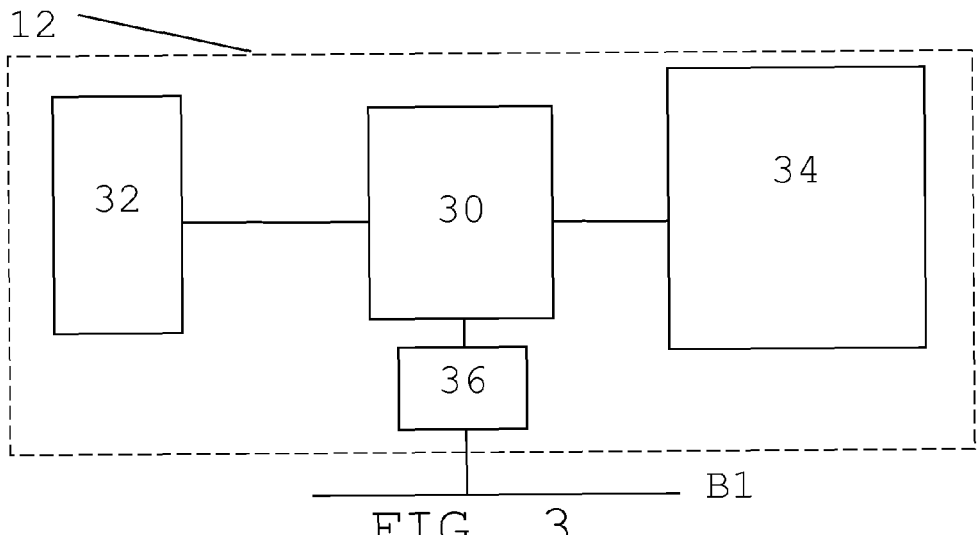

An operator terminal 12, shown in FIG. 3, in a supervisory control system 10 includes a user input unit 32, a display 34, a control unit 30 and an interface 36 for communicating with the other parts of the supervisory control system 10 via the first bus B1. An operator terminal is a graphical user interface for an operator of the system. The control unit may be a processor with an associated program memory including program code for performing the functionality of the present invention, which will be described later on. The user input unit 32 is a unit through which an operator may enter data. As such it may be a keyboard, a keypad or a mouse. It may also be combined with the display 34 in order to together form a touch screen. The operator terminal may also include other user interfaces such as a speaker or a microphone in order to present and receive data to and from one or more operators in other ways than through the display. An operator terminal in a supervisory control system 10 is only one example of a computer in which the present invention may be realized.

Data from the various control and measurement units can be collected and stored in a history data base 18 as well as presented in real-time to an operator via the display 34.

The operator terminal 12 in the supervisory control system 10 has data stored regarding various electrical power transmission control stations of the system 21 and how they are connected to each other via power lines. As known from the art, the operator terminal 12 may then present these data for an operator in the form of graphical symbols representing electrical power transmission control stations and power lines of different types like in FIG. 4. According to the invention, the control unit 30 of the operator terminal 12 is adapted to change the presentation of the structure of the graphically presented system based on operator inputs via the user input unit according to the principles laid out below. This may be based on the user operations in the presentation such as selecting a certain zoom level, selecting a layer with a certain type of elements in the presentation, such as a station or a substation layer. The control unit may thus also automatically change the presentation, for instance based on zoom level, but also based on other system data such as control and protection data, like alarm data event data, control action data and abnormal state data. It may thus change the presentation based on an own selection. An own selection is therefore an operator terminal selection.

Figure 1:
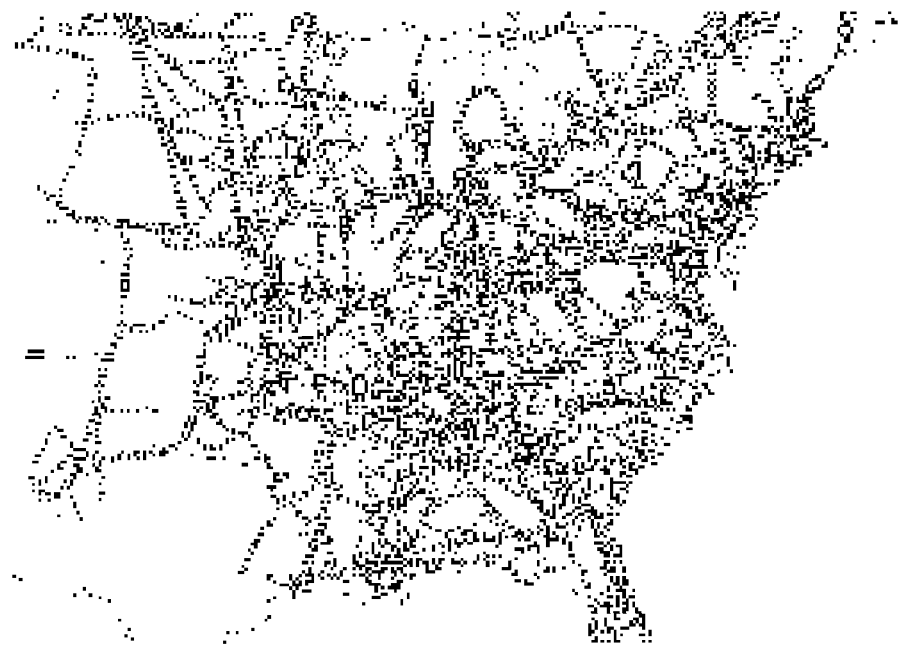
Figure 4:
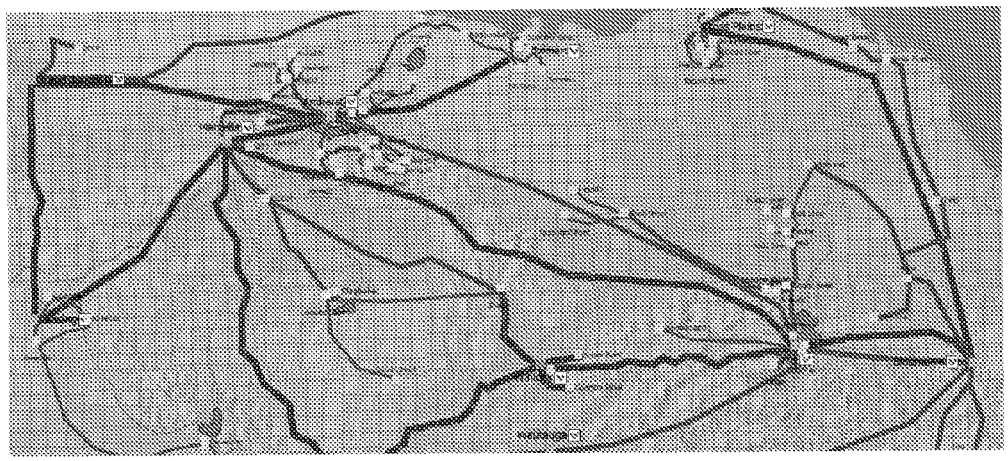

The invention applies several basic visualization methods to allow the operator to see "the big picture" of transmission flow between hundreds of stations and power lines, here exemplified by the graphical symbols representing control stations and power lines shown in FIG. 4, which actually is a section of the map shown in FIG. 1. It is clearly seen that the paths or contours of the power lines match with the geography. The operator can freely select the degree of abstraction or condensation between 0 and 100% depending on the need. The change in degree of abstraction is dynamic, but in below only the extremes are described: detailed and abstracted. Transformation between the extremes is computed dynamically. Here it should be mentioned that also the system may select degrees of abstraction, for instance based on user activities in relation to the presentation, like zoom and layer selections.

The inventive solution is both applicable to a large scale overview that is based on a geographic map (as in ABB Network Management's WS500 software which is used as an example in the figures below) and to a single-line diagram (SLD) which is a standard schematic representation in electrical engineering.

The visual features are mapped as follows:

Shape of power lines:

At the degree of abstraction with most detail, the power lines are drawn in a conventional way by overlaying straight or curvy lines on the map/SLD (FIGS. 1 and 4). The detailed degree of abstraction matches with the conventional approach, where the shape of the power lines match the shape of the geography where they are provided.

Figure 5:
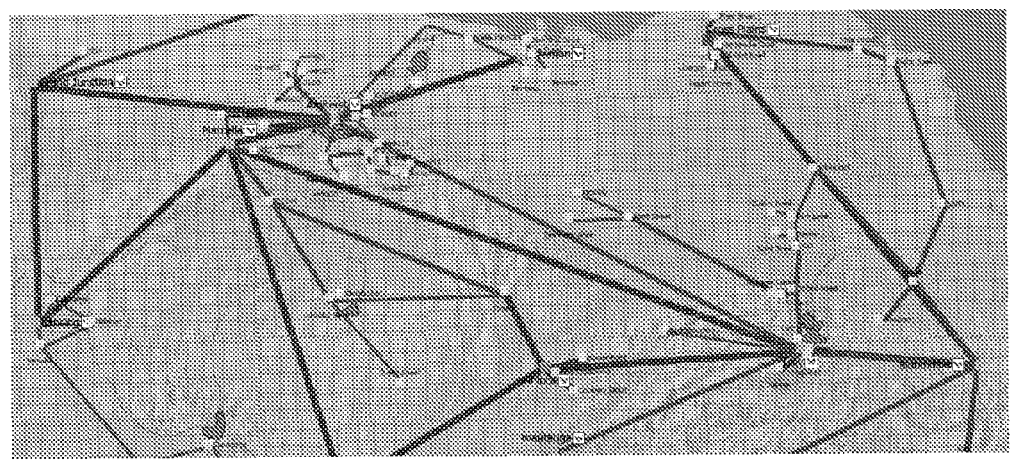

At the highest degree of abstraction, the power lines are represented as straight lines that do not match with the geography of the map (FIG. 5). Accordingly, visual emphasis is made on clarity at the cost of geographic accuracy. Transformation from the detailed to the degree of abstraction is computed automatically so that the shape of the line straightens seamlessly.

Clustering:

At the detailed level, each station is represented as an individual.

At the abstracted level, stations and small power lines between them become one entity represented as a so called treemap according to a certain clustering logic.

Figure 6:
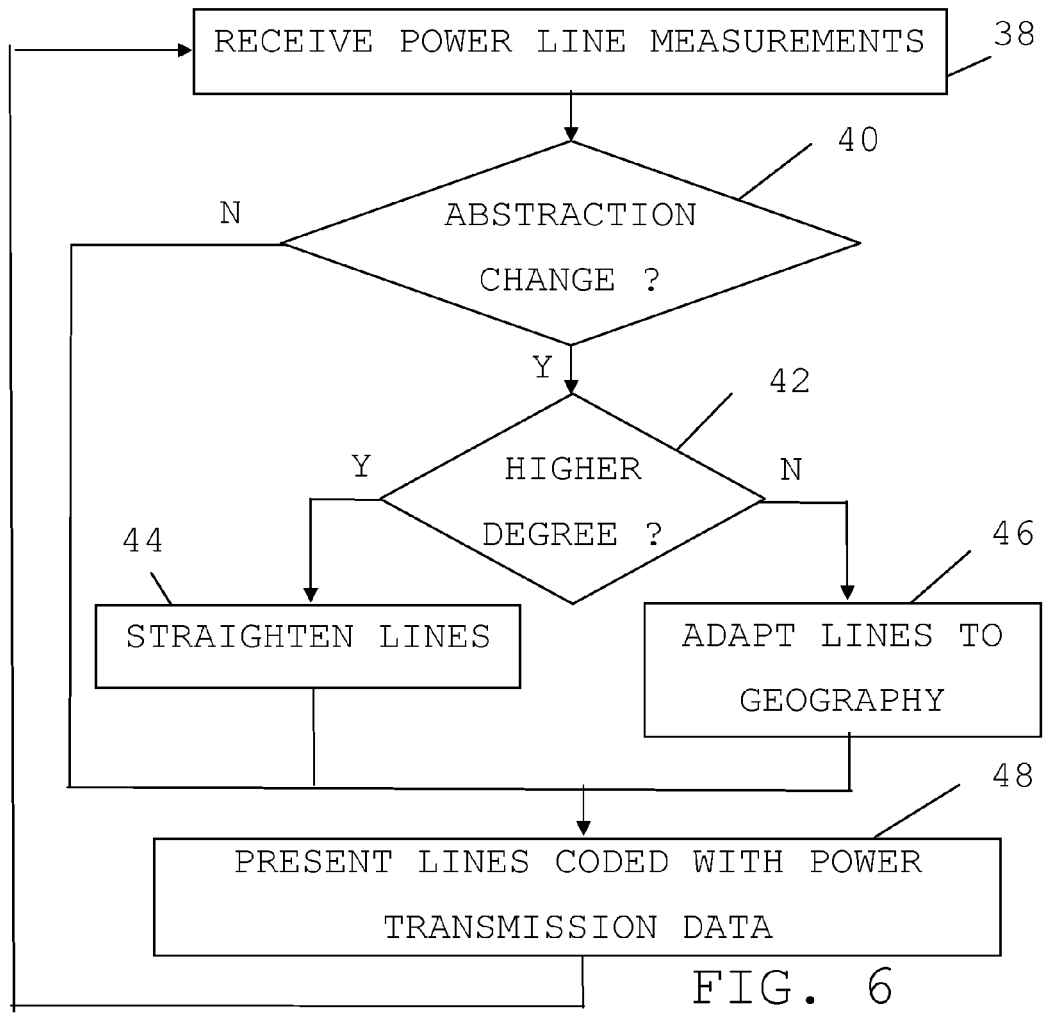

Now a first variation of the invention will be described in somewhat more detail with reference being made to FIGS. 2, 3, 4, 5 and 6, where FIG. 4, schematically shows an overview of a local power transmission system presented with one degree of abstraction on an operator terminal in the power transmission system, FIG. 5 schematically shows an overview of a local power transmission system presented with another degree of abstraction on the operator terminal and FIG. 6 schematically shows a flow chart of a number of method steps being performed in a method according to this first variation of the invention.

The first variation of the invention is directed towards changing the representation of power lines. For a number of power lines shown in FIGS. 4 and 5, the control unit 30 has knowledge of the power rating of these power lines. It also obtains or receives measurements of the power transmitted over the lines, step 38. From these measurements the control unit 30 determines the direction of power flow, i.e. the direction of power transmission, as well as the loading percentage for each line. As an alternative it is possible that these determinations are made at other locations in the system, such as in the first and/or second server 16 and 17, which determinations are then provided to the control unit 30. If then an operator selects a change in degree of abstraction, which is here a change in the degree of abstraction of the power lines, i.e. a change in the presentation of the power lines, such a selection is entered via the user input unit 32 and forwarded to the control unit 30. If there is no change, step 40, then the control unit 30 proceeds and presents the power lines according to a current abstraction setting, which may originally be a setting where the power lines closely follow their actual placement in the geography as shown in FIG. 4. An operator may select degree of abstraction through actions performed in the presentation, such as selecting a layer or zooming, in which case the control unit provides a corresponding degree of abstraction. As an alternative the operator may select the degree of abstraction independently of such activities. The control unit 30 then presents the lines on the display 34 with power transmission data being coded into the representation of the lines, step 48. Each line may here be presented through an inner line which is surrounded by an outer line.

The power transmission data may here include the rated power levels of the lines, which may be coded through varying the thickness of the outer line of the power lines. The thickness may then represent s certain rated or maximum power, for instance the maximum allowable voltage. Additionally or instead it is also possible to use color of both the inner and outer line of a power line, where a certain color represents a certain rated power. It is as an example possible that the color red signifies a maximum voltage of 400 kV, blue represents 200 kV and green represents 100 kV. The power transmission data being coded into a line may also include the direction of transmitted power in a power line, i.e. direction of current flow. It is here possible that the direction of transmitted power is indicated through another coding of the line, for instance through transparency variations of the line. The feeding side of a power line may then be indicated through being more transparent than the opposite side the delivery side.

The power transmission data being coded into a power line may furthermore include the loading percentage, i.e. provide an indication of how much power that is transmitted in relation to the rated power. This coding may be performed through coding of the inner line, for instance through varying the thickness of the inner line. The inner line may furthermore have another nuance of the color assigned to the power line than the outer line. It may for instance be darker, while the outer line is lighter.

In this way power transmission data can be coded into the lines, which data otherwise is often provided as arrows and pie charts that may clutter the view. This way of presenting power transmission data thus simplifies the overview for an operator.

It should here be realized that coding of power transmission data into a power line is optional and may be omitted in various variations of the invention. It is also possible to use traditional ways of indicating such information, such as through pie charts and arrows.

If however the operator selected a change in abstraction degree, step 40, the control unit 30 then determines if there was a higher or a lower degree of abstraction selected, step 42. If the operator selected a higher degree of abstraction, the control unit changes the presentation of the power lines between two control stations through making them straighter, step 44, while if the operator selected a lower degree of abstraction, the power lines are adapted to the geography, step 46. Thereafter the control unit 30 presents the changed power lines coded with power transmission data, step 48, whereupon the control unit 30 receives new power line measurements and possible abstraction change inputs from the operator.

FIG. 4 here shows a view where there is a minimum degree of abstraction, while FIG. 5 shows a view when there is a maximum degree of abstraction. Since a change of degree of abstraction increases the observability for the operator.

Figure 8:
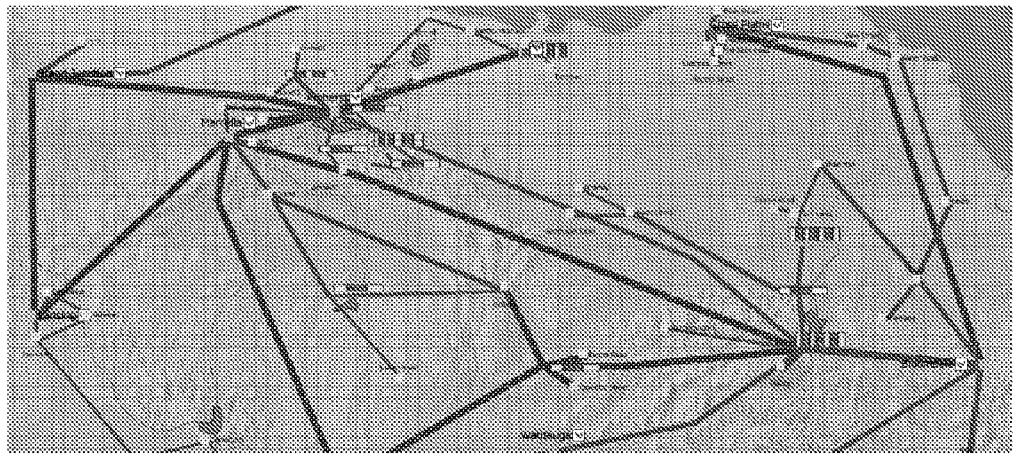
Figure 7C:
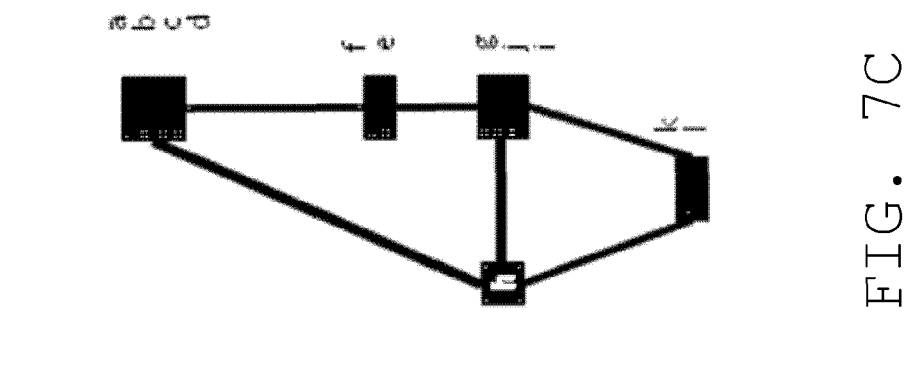
Figure 7B:
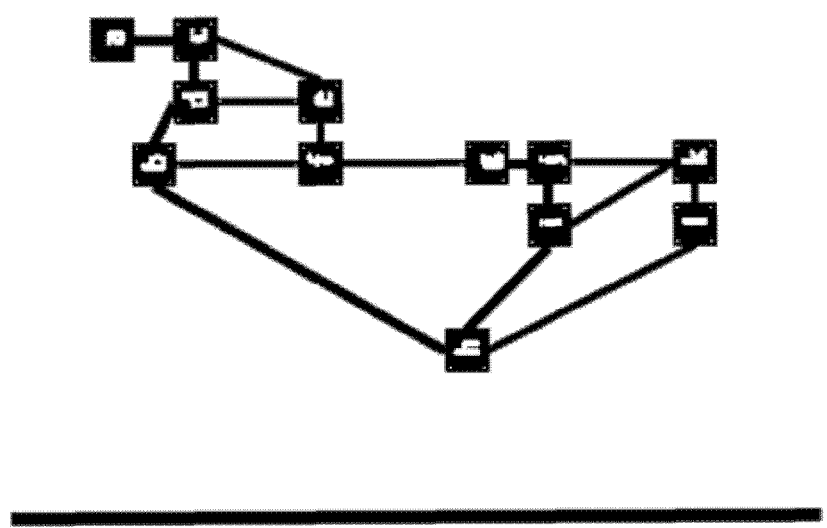
Figure 7A:
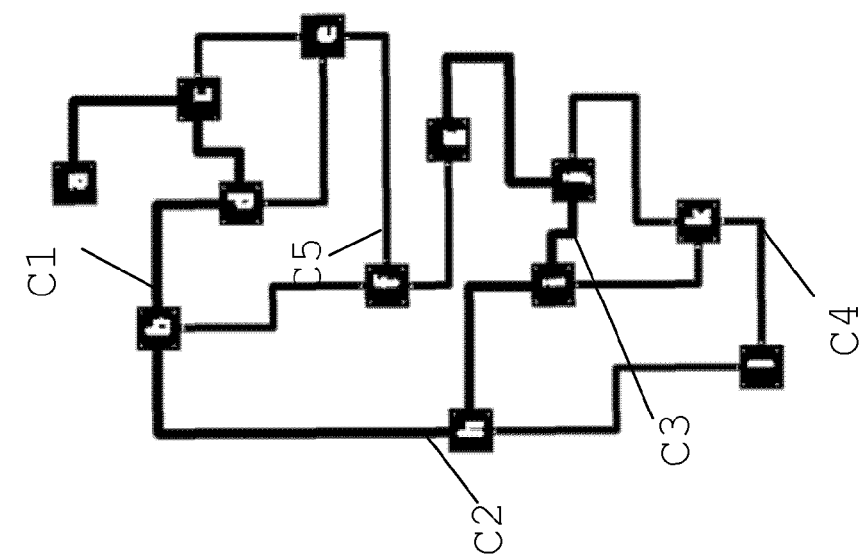
Figure 9:
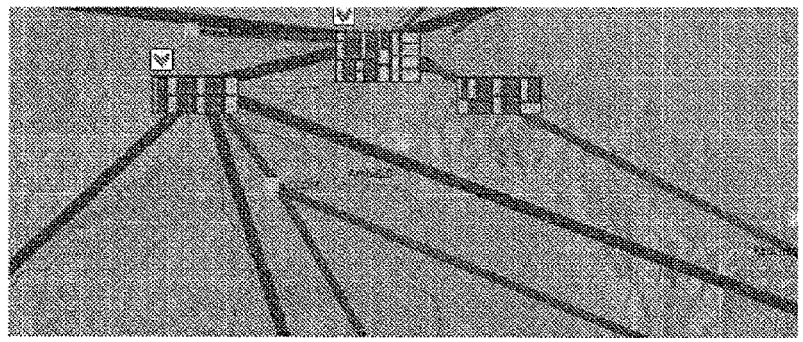
FIG. 9 shows a cluster in closer detail, and FIG. 10 schematically shows a flow chart of a number of method steps being performed in a method according to a second variation the invention.
Figure 10:
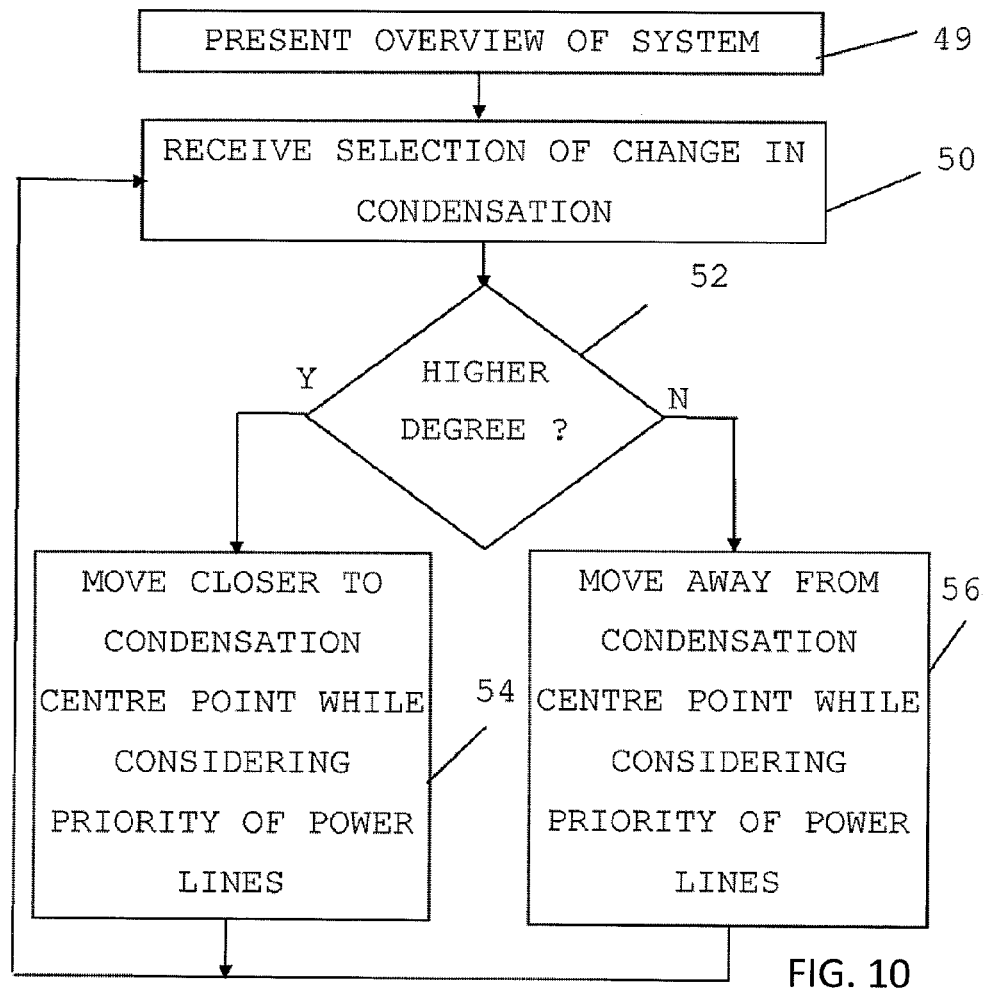

Now a second variation of the invention will be described with reference being made to FIGS. 2, 3, 7A, 7B, 7C, 8, 9 and 10, where FIG. 7A schematically shows an overview of a simplified power transmission system with power lines and substations presented at a minimum condensation degree, FIG. 7B schematically shows an overview of the simplified transmission system with power lines and substations presented at a medium condensation degree, FIG. 7C schematically shows an overview of the simplified power transmission system with power lines and substations presented at a maximum condensation degree, FIG. 8 schematically shows an overview of the power transmission system in FIGS. 4 and 5 with a medium abstraction degree, FIG. 9 shows clusters in more detail and FIG. 10 schematically shows a flow chart of a number of method steps being performed in a method according to this second variation the invention.

This second variation of the invention is directed towards changing the degree of abstraction through changing the degree of condensation of graphical objects in a view, such as the view in FIG. 5. This change in condensation is also termed clustering. It should here be realized that this second variation may be combined with the first variation of the invention. Clustering may thus be combined with changing degree of abstraction of lines and optionally also coding power lines with power transmission data.

FIG. 7A-C outline a simplified power transmission system without the geography in which the system is provided. This is done in order to provide a better understanding of the present invention.

In FIG. 7A, there is shown a conventional representation of individual electrical power transmission control stations (squares) and power lines between the stations as a single line diagram (SLD). However, in this view the power lines are straight. A first type of power line is here a major power line rated for higher power levels and is shown as a thicker line, while a second type of power line that is rated for a lower power level is shown as a thinner line. These power lines may be coded in the same way as in the first variation of the invention.

There are here power lines of the first type interconnecting control stations a, c, d, b, h, i, j and g in that order. The rest are power lines of the second type. There is thus a power line of the second type running between the control stations c and e, a power line of the second type running between the control stations d and e, a power line of the second type running between the control stations e and f, a power line of the second type running between the control stations b and f, a power line of the second type running between the control stations f and g, a power line of the second type running between the control stations h and l, a power line of the second type running between the control stations i and k, a power line of the second type running between the control stations j and k and a power line of the second type running between the control stations l and k.

The graphical representation of the power lines of the first type has, according to this variation of the invention, so called condensation centre points C1, C2 and C3 which the stations are centered at when condensation is performed. Condensation means an increase in the degree of abstraction. A first condensation centre point C1 is here provided at a power line of the first type between the control stations b and d and then close to the control station b, a second condensation centre point C2 is provided on a power line of the first type between the control stations b and h and then close the control station h and a third condensation centre point C3 is provided on a power line of the first type in the middle between the control stations i and j. The first condensation centre point C1 is here a common condensation point for a group of graphical objects including the control stations a, b, c, and d as well as the power lines of the first type running between them. The second condensation centre point C2 is here a common condensation point for a group of graphical objects only including the control station h. The third condensation centre point C3 is here a common condensation point for a group of graphical objects including the control stations g, i and j as well as the power lines of the first type running between them.

Power lines of the second type lacking connections to control stations connected to the power lines of the first type also have condensation centre points C4 and C5. There is here a fourth condensation centre point C4 on the second type of power line between the control stations k and l and then close to control station k as well as a fifth condensation centre point C5 on the power line of the second type between the control stations f and e and closer to the control station f. The fourth condensation centre point C4 is here a common condensation point for a group of graphical objects including the control stations k and l as well as the power line of the second type running between them, while the fifth condensation centre point C5 is a common condensation point for a group of graphical objects including the control stations f and e as well as the power line of the second type running between them.

FIG. 7B here schematically shows partially clustered and joined control stations with straightened power lines; yet all individual features are visible. The control stations have all been moved closer to their respective condensation centre points.

FIG. 7C shows fully clustered; individual control stations and power lines associated with a condensation centre point being condensed into a single graphical object, here called a treemap (rectangle) where the size of a treemap is proportional to the number of control stations and power lines inside it. For example, control stations a, b, c and d and the power lines between them appear as one entity to the top right, hereinafter referred to as a first treemap. A second treemap is formed of control stations f and e and the power line in between; a third treemap represents control stations g, j and i and the power lines between them and a fourth treemap indicates stations l and k and the one power line connecting them. It can here be noted that control station h is not provided in a treemap, since it is the only object associated with the second condensation centre point.

As can be seen in FIG. 7A-C if one control station is connected to two power lines of different types, the movement of the graphical object representing this control station in relation to the condensation centre point of the graphical object representing the power line of the first type has priority over movement in relation to the condensation centre point of the graphical object representing the power line of the second type. This means that a control station is moved towards or from the closest condensation centre point, which may be the condensation point reached via the least number of power lines. If the number of power lines leading from a control station to two different condensation centre points are equal, the condensation point associated with a power line of the first type may have priority over the condensation point of the second type.

In order to better understand how clustering may be provided in the view from FIG. 4, similar views are shown in FIGS. 5 and 8. Here FIG. 4 corresponds to the situation in FIG. 7A, FIG. 8 corresponds to a situation with a condensation degree somewhere between the condensation degrees of FIGS. 7B and 7C where some control stations and power lines have been clustered, while FIG. 9 shows three clusters essentially corresponding to the situation in FIG. 7C where a lot of clustering has taken place.

In FIG. 9 lighter rectangles in a treemap indicate control stations, while darker rectangles are power lines. A rectangle representing a power line interconnecting two control stations is furthermore shown as provided between the rectangles representing these control stations.

The power lines within a treemap may optionally include the rated level and loading percentage information.

It is furthermore possible that a treemap may include a symbol representing an element in a control station, such as a process control element, like a transformer, a generator or a circuit breaker. This symbol shown may be automatically selected by the system, for instance based on if an alarm has been generated in relation to it. It can also be selected by an operator. The system may furthermore select element based on what is most frequently selected by operators. When presenting such an element it is also possible to present further data of the element, such as a measurement value, a status value or if an alarm has been generated. This may be done through color or animation, like blinking. One or more such elements may be presented as a part of the object representing the control station in question. The control unit may thus fetch such data and then present it on the display for instance as a part of the representation of the corresponding control station.

Transformation between the various phases shown in FIGS. 7A-C, 5 and 8 may be computed dynamically according to the chosen degree of abstraction. At 100% abstraction there would be only one large treemap visible, having all the stations and power lines inside it.

In this second variation of the invention, the control unit 30 presents the graphical objects representing the control stations and the power lines on the display, step 49. The presentation may here be made at a default condensation degree that may be based on the zoom level of the view. The control unit 30 may thereafter receive a selection of a change in abstraction, which is a change in condensation, from the operator via the user input unit 32, step 50. This may be made through the operator performing actions in relation to the presentation such as selecting a layer of objects or zoom level. Based on the activities, the control unit 30 may then select a corresponding condensation degree. The operator may also select degree of abstraction independently of such activities. In this way the control unit 30 investigates if the change involves an increase or a decrease in condensation, step 52. In case the change is an increase in condensation, the control unit 30 changes the presentation of the view through moving the objects in the groups, i.e. control stations and the power lines connecting them, closer to their corresponding condensation points, step 54, while if the change is a decrease of condensation, the control unit moves the objects further away from their condensation points, step 56. This is done while also considering the priority of the power lines. Thereafter the control unit goes back and awaits operator inputs or a protection and control related event that can cause a change in degree of abstraction, step 50.

The change in condensation described above may thus be selected by the control unit automatically based on event in the system such as based on event and alarm data, a control action performed in the system or an abnormal state in the system from one or more of the control stations. A control station may thus protection and control data to the operator terminal where the system overview is provided. It is then possible that the control unit when providing a change in presentation made for an operator then takes this protection and control data into consideration. This may involve stopping the graphical symbol of this control station from being moved towards a corresponding condensation centre point. It may here instead enlarge the size of the graphical representation of the control station.

The invention has a number of advantages. By applying dynamic clustering, the large amount of visually perceivable information can be organized by the operator with a preferred degree of abstraction in which it is easy to understand. This allows the operator to organize the information to relevant clusters and in this way he or she can understand all the detail while at the same time getting an understanding of events on a larger scale. This also allows an operator to discern power lines and control stations that are located closely to each other and would otherwise not be possible to perceive at a certain zoom level of the presentation. Detailed information is condensed to treemaps that are capable of representing all the details (control stations, power lines) in a compact visual space. Abstraction of power lines allows the operator to see the "big picture", e.g. examine transmission flow across for instance a whole continent or country. In that case the exact path of an individual power line is not relevant anymore, thus, reduction of the visual features supports the logical working task instead of having all irrelevant details visible. Through coding of power transmission data into a power line further enhancement of the visibility of details is obtained without adding further objects.

The operator terminal may, as was previously described, preferably be provided in the form of one or more processors together with computer program memory including computer program code for performing the present invention. This computer program code may also be provided on one or more data carriers which performs the functionality of the present invention when the program code thereon is being loaded in an operator terminal.

The invention claimed is:

1. A method of enabling an operator to obtain a better overview of a presentation of electrical power transmission control stations connected to power lines in a power transmission or distribution system, comprising the steps of:
> presenting graphical objects representing the electrical power transmission control stations together with graphical objects representing the power lines on an operator terminal display, and
> changing the degree of abstraction of the presentation based on an operator or operator terminal selection,
> wherein a change from a lower to a higher degree of abstraction of the presentation involves moving a group of graphical objects including graphical objects representing control stations closer to a condensation centre point provided on a graphical object representing a power line that is common for this group, and
> a change from a higher to a lower degree of abstraction of the presentation involves moving the group away from the condensation centre point provided on the graphical representation of said common power line,
> where the power lines are of a first and a second type and if one control station is connected to two power lines of different types, the movement of the graphical object representing this control station closer to or away from the condensation centre point of the graphical object representing the power line of the first type has a higher priority over the movement of the graphical object representing this control station closer to or away from the condensation centre point of the graphical object representing the power line of the second type, wherein having a higher priority of movement allows a larger interval of movement closer to or away from the condensation centre point of the graphical object representing the power line of the first type over the movement closer to or away from the condensation centre point of the graphical object representing the power line of the second type.

2. The method according to claim 1, further comprising the step of receiving an operator selection of a higher or a lower degree of abstraction in the presentation of power transmission control stations and power lines, and changing the degree of abstraction based on the operator selection.

3. The method according to claim 2, wherein the operator selection is performed through an operator activity performed in the presentation.

4. The method according to claim 3, wherein the only graphical objects representing the power lines of the second type that have condensation centre points are the graphical objects that lack connections to graphical objects representing the control stations being connected to graphical symbols of lines objects representing the power lines of the first type.

5. The method according to claim 1, wherein at the highest degree of abstraction all graphical objects of the group have been joined for forming one graphical object.

6. The method according to claim 5, wherein said one graphical object also includes a symbol of a system element within at least one of the control stations.

7. The method according to claim 1, further comprising the step of receiving protection and control related data from one of the control stations, where the operator terminal selection of the change in presentation of at least this control station is made in dependence of the received protection and control data.

8. The method according to claim 7, wherein the operator terminal selection of the change in presentation involves stopping the graphical symbol of this station from being moved towards a corresponding condensation centre point.

9. The method according to claim 1, wherein a group also includes power lines.

10. The method according to claim 1, wherein the step of changing the presentation involves straightening the graphical objects representing power lines if there is a change from a lower to a higher degree of abstraction.

11. The method according to claim 1, further comprising the step of presenting a power line with power transmission data coded into the line.

12. An operator terminal in a power transmission or distribution system including a display, a user input unit and a control unit configured to
> present graphical objects representing electrical power transmission control stations together with graphical objects representing power lines on the display, and
> change the degree of abstraction of the presentation based on an operator selection or an own selection,
> wherein the control unit when changing from a lower to a higher degree of abstraction of the presentation is configured to move a group of graphical objects including graphical objects representing control stations closer to a condensation centre point provided on a graphical object representing a power line that is common for this group, and when changing from a higher to a lower degree of abstraction of the presentation is configured to move the group away from the condensation centre point provided on the graphical representation of said common power line,
> wherein the power lines are of a first and a second type and if one control station is connected to two power lines of different types, the control unit is configured to give a higher priority to the movement of the graphical object representing this control station closer to or away from the condensation centre point of the graphical object representing the power line of the first type over movement of the graphical object representing this control station closer to or away from the condensation centre point of the graphical object representing the power line of the second type, wherein having a higher priority of movement allows a larger interval of movement closer to or away from the condensation centre point of the graphical object representing the power line of the first type over the movement closer to or away from the condensation centre point of the graphical object representing the power line of the second type.

13. The operator terminal according to claim 12, wherein the control unit is configured to receive an operator selection of a higher or a lower degree of abstraction in the presentation of electrical power transmission control stations and power lines and change the degree of abstraction based on the operator selection.

14. The operator terminal according to claim 12, wherein the control unit is configured to change the degree of abstraction based on an operator activity performed in the presentation.

15. The operator terminal according to claim 12, wherein the control unit is further configured to receive protection and control data from one of the control stations and to make an own selection of the change in presentation of at least this control station in dependence of the received protection and control data.

16. The operator terminal according to claim 12, wherein the control unit when changing the presentation is further configured to straighten the graphical objects representing power lines if there is a change from a lower to a higher degree of abstraction.

17. The operator terminal according to claim 12, wherein the control unit is further configured to present a power line with power transmission data coded into the line.

18. A computer program product embodied on a non-transitory computer readable medium, comprising computer program code configured to cause an operator terminal provided in power transmission or distribution system to, when said program code is loaded into said operator terminal
- present graphical objects representing electrical power transmission control stations together with graphical objects representing power lines on a display of the operator terminal, and
- change the degree of abstraction of the presentation based on an operator or operator terminal selection,
- wherein a change from a lower to a higher degree of abstraction of the presentation involves moving a group of graphical objects including graphical objects representing control stations closer to a condensation centre point provided on a graphical object representing a power line that is common for this group, and a change from a higher to a lower degree of abstraction of the presentation involves moving the group away from the condensation centre point provided on the graphical representation of said common power line,
- wherein the power lines are of a first and a second type and if one control station is connected to two power lines of different types, the computer program code is configured to cause the operator terminal to give a higher priority to the movement of the graphical object representing this control station closer to or away from the condensation centre point of the graphical object representing the power line of the first type over movement of the graphical object representing this control station closer to or away from the condensation centre point of the graphical object representing the power line of the second type, wherein having a higher priority of movement allows a larger interval of movement closer to or away from the condensation centre point of the graphical object representing the power line of the first type over the movement closer to or away from the condensation centre point of the graphical object representing the power line of the second type.

19. The method according to claim 2, wherein at the highest degree of abstraction all graphical objects of the group have been joined for forming one graphical object.

20. The method according to claim 3, wherein at the highest degree of abstraction all graphical objects of the group have been joined for forming one graphical object.

* * * * *